United States Patent Office 3,684,613
Patented Aug. 15, 1972

3,684,613
PROCEDURE FOR TEMPORARILY ATTACHING A PRESSURE PLATE TO A HEATER PLATE
Hans Frohning, Essen, Germany, assignor to Th. Goldschmidt AG, Essen Germany
Filed Feb. 5, 1970, Ser. No. 8,923
Claims priority, application Germany, July 15, 1969, P 19 35 901.4; Oct. 21, 1969, P 19 52 923.8
Int. Cl. B30b 9/00
U.S. Cl. 156—289                              20 Claims

ABSTRACT OF THE DISCLOSURE

A caul or pressure plate is temporarily attached to the pressure transmitting surface of a heater plate or platen of a hot press by introducing a substance between the heater plate and the pressure plate which, under the operational conditions of the press, is liquid or flowable and forms an adhesive layer which exerts adhesion and cohesion forces which correspond at least to the weight of the pressure plate.

FIELD OF THE INVENTION

The invention relates to the temporary attachment of caul or pressure plates to the heated, pressure transmitting surface of hot presses.

While the invention is generally applicable to the temporary attachment of caul or pressure plates to the heated surfaces of hot presses, the invention is particularly useful for, and will thus primarily be described in connection with the temporary attachment of caul or pressure plates to the heater plates (or platens) of power operated, e.g. hydraulic hot presses used, for example, for surface coating or lamination as well as the surface improvement of areal base materials, such as wood boards, fibrous sheets and the like, with heat hardenable or curable plastics.

BACKGROUND INFORMATION AND PRIOR ART

In the surface coating and surface improvement (hereinafter referred to as "laminating") of base materials such as, for example, plates or boards of wood, including plywood and veneer, wood chips or fibres or other fibrous materials (hereinafter collectively referred to as "wood boards") heat curable plastics are bonded to the surface of such wood boards under the application of heat and pressure.

As a general rule the heat curable plastics or resins to be applied to the wood board surfaces are not available as or cannot be processed into selfsupporting foils or sheets. For this reason filler or carrier webs, usually of paper or the like fibrous material, are first impregnated with a solution of the heat hardenable resins, whereupon the impregnated carrier web is dried to drive off the solvent. The drying usually results in partial curing of the resin. A large variety of heat curable synthetic resins is being used for the indicated purpose. Thus, for example laminating of wood boards is frequently carried out with carrier or filler webs impregnated with phenol formaldehyde resin precondensates as well as aminoplast resin precondensates, which are obtained by condensation of formaldehyde with urea or melamine or other suitable aminoplast resin formers, such as, for example, thiourea or mixtures thereof.

In practice, the lamination is customarily carried out by first forming a lay-up of the resin impregnated carrier webs with the wood board, the former being placed on the top and/or bottom surfaces of the latter, whereupon the lay-up is inserted into a heatable press. With a view to preventing direct contact between the resin impregnated filler webs and the heated surfaces of the hot press, it is customary to interpose a caul or pressure plate (hereinafter referred to as pressure plate) between the respective filler web and the pressure transmitting heater plates or platens (hereinafter referred to as heater plates) of the press which may be in the form of or part of the press head or ram. The pressure plates are customarily chromium plated brass plates or plates of steel, aluminum or another suitable metal. During the compression or pressing procedure proper, these pressure plates transfer their surface finish on to the surface of the adjacent resin layer. Dependent on the nature of the desired surface, the pressure plates are thus imparted with glossy, dull, satinlike or other desirable surface finishes.

Occasionally a pressure cushion or pad is additionally inserted between the pressure plate and the heater plate, in order to prevent deformation of the pressure plate due to extraneous particles such as dirt. At the same time, such pressure cushions act to equalize the pressure. Pressure cushions of this kind consist, for example, of a cotton-asbestos fabric. However, it should be emphasized that the use of such pressure cushions is not always required and can be dispensed with, particularly if the wood boards themselves exert a certain cushioning effect under the conditions of compression as prevailing in the press.

It will be appreciated that before the actual compression procedure can be initiated the respective lay-up has first to be assembled and the lay-up is then inserted into the press. Thus, for example, if pressure cushions are used, the lay-up including the heater plates between which the lay-up is inserted would have the following sequence:

Heater plate
Pressure cushion
Pressure plate
One or several resin impregnated filler webs
Wood board
One or several resin impregnated filler webs
Pressure plate
Pressure cushion
Heater plate To assemble a lay-up of this nature is, of course, a very timeconsuming task which considerably and negatively affects the output of the press.

Various attempts have thus been made with the view of reducing the preparatory period necessary for assembling the lay-up. Accordingly it has been suggested to leave the pressure plates within the press proper and to mount them in a suitable manner on the heating surfaces of the hot press. However, from a practical point of view and according to prior art suggestions, the pressure plates can be secured at the edge or peripheral portions of the press only. This is disadvantageous, because the upper pressure plate, particularly if the plate has a relatively large surface area, has then a tendency to sag at its center area.

This means that a space is formed between the center portions of the pressure plate and the heater plate. The distance from the sagging pressure plate to the heater plate is then often considerable. In practice it has been found that marginal mounting of the pressure plate to the press may thus result in distances from the pressure plate to the heater plate of a magnitude of 10 cm. or even more. This, of course, is highly undesired because the sagging of the upper pressure plate renders it necessary to enlarge the clear width of the press. This in turn prolongs the closing time for the press. A prolonged closing time for the press, however, results in premature curing of the resin on the filler web which is situated between the lower heater plate and the wood board. Further, it is, of course, highly detrimental and disadvantageous that the heat transfer between the upper heater plate and the sagging pressure plate is interrupted by the space referred to as soon as the press is opened. This in turn requires considerably extended compression times since also the cooled sagging pressure plate has to be reheated to the necessary temperature.

Arrangements in which the pressure plates are marginally or peripherally mounted within the press proper are thus disadvantageous and also run counter to the recent trend of effecting lamination of wood boards in continuous presses or so called rapid cycle presses, which presupposes extremely short compression times. If the pressure plates are mounted in the indicated manner, the required compression time is much too long for effective use of continuous or rapid cycle presses. In this context, it should be noted that recently a considerable reduction of the compression time has been rendered possible by newly developed, highly reactive aminoplast resins. Such resins can be cured within a very brief time period of, for example, 10 to 150 seconds at temperatures of between 110–200° C. The curing takes place without causing the resins to become brittle or to develop a tendency for cracks and fissures. In order properly to utilize the extremely rapid curability of such highly reactive aminoplast resins, it is, of course, necessary to construct or adapt the presses in a suitable way so that the pressure curing can be effected within a short period. As will be readily appreciated from the above, prior art methods for temporarily mounting the pressure plates on the heater plates are thus not at all suitable for such high speed presses and procedures.

Several proposals have recently been put forward in order to prevent the disadvantageous sagging of the pressure plates. The difficulties in remedying the situation reside, however, in the fact that mechanical securing means for attaching the pressure plates to the press or the heater plates should only engage at the rim or edge portions of the pressure plates. According to some prior art proposals, hydraulically operating mounting mechanisms were provided which engaged the rim portions of the pressure plates. These mechanisms, however, do not fully prevent the sagging. According to other suggestions which have been put forward from time to time, the pressure plates are temporarily fixed or attached to the heater plates or other elements of the press by magnetic means or by subjecting the heating surfaces of the hot press to vacuum conditions, the vacuum, in turn, urging the pressure plate against the heater plate surface. However, these proposals have not met with success, because either they did not remedy the situation or they were too complicated and expensive to be of practical use. To permanently bond the pressure plate to the heater plate surface by adhesive means is practically not possible since the pressure plates have a relatively limited life only and thus have frequently to be replaced. To remove a permanently connected pressure plate from the surface of the heater plate would constitute a major time consuming and expensive task which moreover results in damage to the heater plate surfaces and pressure plates. Permanent cementing procedures for attaching the pressure plate to the heater plate surfaces can therefore be disregarded.

SUMMARY OF THE INVENTION

It is a primary object of the present invention to overcome the disadvantages and drawbacks of the prior art procedures referred to and to provide a procedure for temporarily attaching pressure plates to heater plate surfaces of hot presses which is exceedingly simply to carry out and according to which the pressure plates can again be removed from the press without difficulty and without resulting in damage to the heater plates and/or pressure plates.

Another object of the invention is to provide for a method of the indicated kind which can be practiced in existing presses without requiring any modification or alterations thereof.

Briefly, and in accordance with this invention, the pressure plates are temporarily attached to the heating surfaces of hot presses, to wit, for example to the pressure transmitting surfaces of heater plates, by introducing between the pressure transmitting surface of the heater plate and the pressure plate a substance which, under the operating conditions, is either liquid or flowable and forms an adhesive intermediate layer whose adhesion forces and cohesion force correspond at least to the weight of the pressure plate. The adhesion and cohesion forces of the layer interposed between the heater plate and the pressure plate are thus suffiicent to maintain the pressure plate on the intermediate layer and thus on the heater plate surface.

It should be emphasized that the temporary attachment of the pressure plates in accordance with this invention is essentially by way of physical forces. The chemical structure or composition of the substance to be used in accordance with this invention is of secondary importance, as long as it possesses the required physical characteristics. The crux of the invention, which is decisive for successful performance of the inventive procedure, is the formation of the adhesion and cohesion force exerting intermediate layer which, in turn presupposes that the substance forming the layer is liquid or flowable under the operating conditions and that the adhesion forces, which are formed in the interface between the adhesive intermediate layer and the heating surface of the heater plate on the one hand and the adhesive intermediate layer and the pressure plate on the other hand, as well as the cohesion force of the intermediate layer proper, correspond at least to the weight of the pressure plate.

Particularly suitable for the formation of the adhesive intermediate layer are thermoplastic substances of varying kind. Thus, for example, thermoplastic substances such as polyethylene, polypropylene, polyisobutylene, polystyrene, polyvinylchloride, polyvinylfluoride, polymethylmethacrylate, polyamide, phenoxyresin, polycarbonate, polyvinylalcohol, polyvinylformal, polyvinylbutyral, cumaronindeneresins, polyethyleneglycoltereph-thalate are eminently suitable for the inventive purposes.

Knowing that the respective substance must be liquid or flowable under the respective operating conditions, a person who wishes to make use of the invention will thus choose a substance whose molecular weight is such that the substance is or becomes liquid or softens to a sufficient extent at the conditions under which the press is to be operated. It is, of course, feasible to use individual or several polymers in mixture, provided, of course, that the respective polymers are compatible with each other. Further, copolymers can be used. The flowability of the copolymers at the respective temperatures can then be influenced in the desired manner by suitably choosing the type and quantity of the monomers. Another possibility for influencing in the desired manner the softening or flowability characteristics within the respective temperature range resides in the addition of known customary plasticizers to the respective substances proper.

It will be understood that the polymers should, of course, have satisfactory thermostability under the operating conditions so as to avoid frequent replacement of the substance.

From a practical point of view, it has been found to be particularly advantageous if the thermoplastic substance is used in the form or as effective component of a foil. The foil is then placed between the pressure plate and the heating surface of the heater plate. The press is closed and heated. The heating renders the thermoplast liquid or flowable so that the desired adhesive intermediate layer is formed. Upon opening of the press the pressure plate is thus temporarily attached to the heater plate and the press is ready for operation. When it is desired to remove the pressure plate from the press, the pressure plate, may be drawn off hot by peeling the plate starting from one corner and in a direction perpendicular to the heater plate. Alternatively, dependent on the nature of the particular intermediate layer used, the press may be permitted to cool so that the substance solidifies whereupon the pressure plate can be readily removed from the heater plate by slight pulling.

It is also within the scope of this invention to use a plurality of the same or different foils. It is thus feasible, for example, to build up an intermediate layer with different foils by covering a central foil, which is mechanically stable under the compression conditions, on its upper and lower side with foils of satisfactory flowability characteristics. These cover foils then become fused to the central carrier foil under the operating conditions, for example, by dissolution of the cover foils in the carrier foil or by swelling. The fusing of the cover foils to the central carrier foil can be facilitated by applying the plastic material, which coats the carrier foil, in dissolved form and by permitting the solvent to evaporate.

The extent of the adhesion of the pressure plate to the heater plate can be influenced by a suitable surface treatment, for example, the respective surface may be intentionally made smooth or rough. In this manner the adhesion force may thus be increased or decreased. Further, by introducing separating agents, the adhesion can be decreased particularly during cold conditions. The use of separating agents is primarily recommended, if not necessary, if the substance to be used has a tendency to exert adhesive activity after cooling. Thus in order to prevent sticking of the substance to either the pressure plate or the heater plate, separating agents should be used. Any sticking after cooling of the press should preferably be avoided since it is the very purpose of the invention to accomplish a temporary attachment or fixation only.

The inventive procedure is also applicable if a pressure cushion or pad is interposed between the heating surface of the heater plate and the pressure plate. However, it will be appreciated that in such instances a substance forming an adhesive intermediate layer of the kind previously described must then also be introduced between the heating surface of the heater plate and the pressure cushion as well as between the pressure cushion and the pressure plate. For such purpose, it is of particular advantage to use thermoplastic foils which, under the compression conditions, exhibit a flowability which prevents complete penetration of the thermoplast into the pressure cushion. The flowing thermoplast should rather remain essentially on the surface of the pressure cushion without however completely penetrating into the cushion mass proper.

Although the inventive procedure is suitably performed with thermoplastic polymers, as set forth above, it should be emphasized that the invention is not limited to such substances. Thus, the invention also encompasses the use of substances which are liquid at room temperature. A substance of this nature which is particularly suitable for the inventive purposes is silicone oil. Silicone oil has the advantage that it is thermally extremely stable and exhibits insignificant viscosity change upon heating. From a practical point of view it has been found that silicone oil having a viscosity of at least 10,000 cp. at 20° C. is particularly suitable for the indicated purpose.

A further substance which can be successfully used for the inventive purposes is sulphur. It is known that sulphur forms different modifications at different temperatures: Thus β-sulphur melts at 119° C. and forms a modification which is generally referred to as λ-sulphur. λ-sulphur readily liquifies, to wit, it has a low viscosity. This λ-sulphur is in equilibrium with viscous, tenacious μ-sulphur. With increasing temperature the highly viscous μ-sulphur moiety increases. Sulphur vaporizes at 444.6° C. Since only the μ-sulphur is in the position to form an intermediate layer of sufficiently high cohesion, sulphur can only be used for the formation of a suitable adhesive intermediate layer in that temperature range in which the formation of the μ-sulphur is favored and is already present in a sufficient amount. This occurs essentially at temperatures above 160° C. The upper temperature limit is determined by the maximum compression temperature which is always below that range in which the sulphur melt again becomes more thinly liquid.

As pointed out previously, the inventive procedure renders it possible to carry out the compression procedure in a more economic manner whereby the output of the presses is significantly increased.

In further modification of the invention, the compression time can be significantly reduced by improving the heat transfer from the heater plate to the pressure plate. This in turn requires that the passage of heat through the adhesive layer located between the heater plate and the pressure plate be facilitated. This can effectively be accomplished by incorporating in the substance forming the adhesive layer a sufficient amount of a heat conducting material in fine particle form. Thus, for example, if the substance is admixed with metal powder or graphite, the heat transfer from the heater plate to the pressure plate is significantly increased. Aluminum powder exhibits particularly advantageous characteristics in this respect. The aluminum or the like metal powder can be incorporated in the thermoplastic substance or, in case a silicone oil is used, the metal powder may be added to the oil. The amount of metal powder to be used for this purpose will be calculated so that in respect to the lower limit value the desired increased heat conductivity is accomplished, while in respect to the upper limit value the formation of the desired adhesive intermediate layer should not be endangered. Experiments have indicated that in respect to aluminum powder, 5–60% by weight, calculated on the amount of substance, gives excellent results. It will be understood that in the event that sulphur is used as a substance, metal powder cannot successfully be used as fillers.

The inventive procedure can also successfully be used for the temporary attachment of press molds to the heating surfaces of hot presses. These press molds as they are used for example for the production of trays, dishes, plates, cups and the like, are usually relatively massive and exhibit a smooth base surface. The applicability of the inventive procedure for the temporary attachment of such press molds is however limited to a certain extent by the fact that the adhesion and cohesion forces of the adhesive intermediate layer are capable of carrying and retaining limited weights only. Thus, if the press mold is very heavy, the inventive procedure may not be applicable.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and descibed preferred embodiments of the invention.

DESCRIPTION OF THE DRAWINGS

FIG. 1 is a somewhat diagrammatic showing of a lay-up or assembly, in accordance with the inventive procedure, employing pressure cushions and including the heater plates of the press, while

In FIG. 1 reference numeral 1 indicates the top heater plate of a hot press, which otherwise is not shown, reference numeral 1', in turn, indicating the lower heater plate, between which the lay-up generally referred to by reference numeral 10 is inserted. The lay-up 10 comprises an upper thermoplastic foil 2 interposed between an upper pressure cushion 3, and a lower thermoplastic foil 2' interposed between a lower pressure cushion 3'. An upper thermoplastic foil 12, which is of the same nature as the thermoplastic foil 2, is, in turn, interposed between the upper pressure cushion 3 and the upper pressure plate 4, while a corresponding thermoplastic foil 12' is interposed between the lower pressure cushion 3' and the lower pressure plate 4'. The pressure cushions were made of cotton-asbestos fabrics, while the pressure plates were made from chromium plated brass or aluminum. The two sections of the lay-up thus far described are placed on either side of a woodboard 5.

In order temporarily to attach the pressure plates 4 and 4' and the cushions 3 and 3' the press is closed and heated. The foils 2, 2' and 12 and 12' form now the adhesive intermediate layers. The press is then opened and the wood board is removed. The pressure plates are now temporarily fixed to the pressure cushions, while the pressure cushions, in turn, are temporarily fixed to the heater plates. The actual laminating operation can now be intiated by inserting a wood board into the open press with resin impregnated filler webs being placed on the top and bottom surfaces of the board, whereupon the press is closed again.

Figure 1:
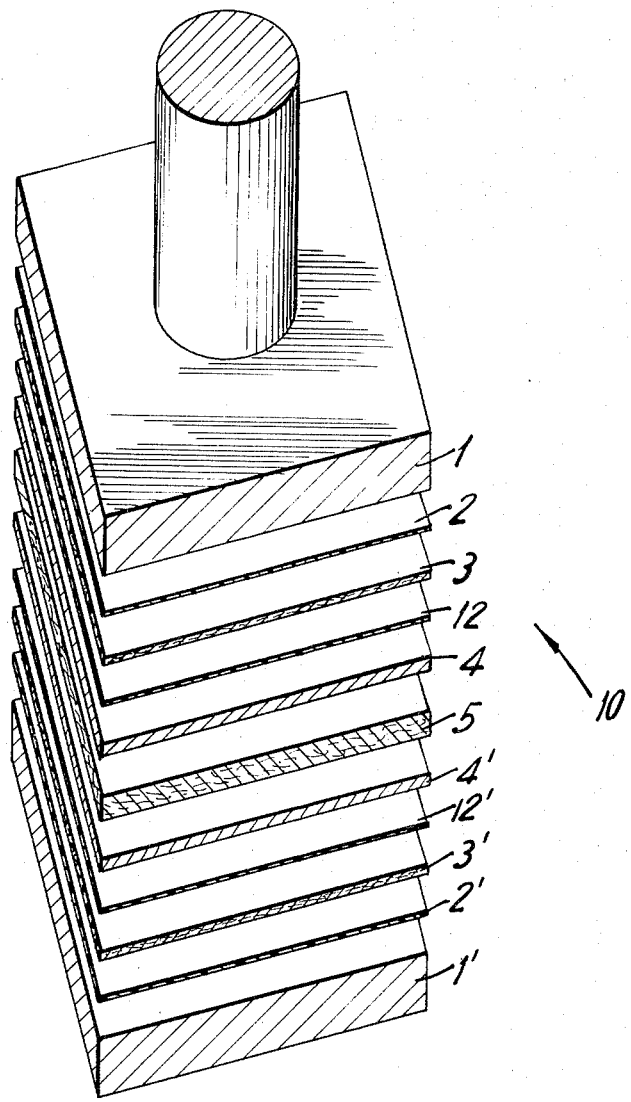
Figure 2:
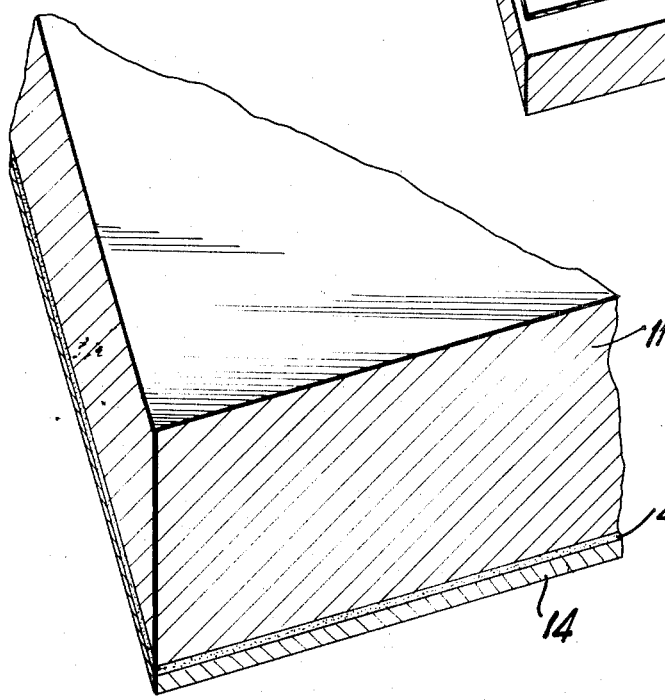
FIG. 2 is a diagrammatic showing of an arrangement without the use of pressure cushions.

Referring now to FIG. 2, it will be noted that merely an upper heater plate 11 has been shown, the pressure plate 14 being temporarily attached to the heater plate 11 by means of the interposed intermediate layer 21. Intermediate layer 21 is formed of a liquid or flowable substance whose adhesion and cohesion forces are sufficient to retain the pressure plate 14.

The invention will now be described by several examples, it being understood, however, that these examples are given by way of illustration and not by way of limitation and that many changes may be effected without affecting in any way the scope and spirit of the invention as recited in the appended claims.

The method, used in the examples of the purpose of determining the softening point according to Vicat, was that described in ASTM D 1526–65 T.

Example 1.—Use of a foil made from polycarbonate with a softening point according to Vicat of 150° C. and of a polystyrene foil having a softening point according to Vicat of 100° C.

A lay-up assembly of the following composition, seen from the bottom towards the top, was prepared:

A polycarbonate foil of a thickness of 0.1 mm.;
A polystyrene foil of a thickness of 0.05 mm.;
A pressure plate of brass, chromium-plated on both sides and having a thickness of 2.0 mm.;
Wood board of 10.0 mm.;
A pressure plate of brass, chromium plated on both sides and having a thickness of 2.0 mm.;
A polystyrene foil of 0.05 mm.;
A polycarbonate foil of 0.1 mm.

The lay-up was inserted into a hydraulic hot press and compression was effected at a press temperature of 170° C. and a pressure of 25 kp./cm.$^2$.

The press was first closed for a brief period and then was opened again in order to permit escape of trapped air. The press was then closed again and the compression was effected for 10 minutes at the indicated temperature and pressure. The press was then opened and the wood board was removed. It was found that the pressure plates had become attached to the respective upper and lower heater plates. The press was now ready for operation, to wit, e.g. for laminating woodboards and the like.

For the purpose of removing the pressure plates the press was closed again and was cooled under pressure to a temperature of 20° C. whereupon the press was opened. The plates could now be taken off the heater plate surfaces by a slight pull and without any significant force being necessary.

Example 2.—Use of a polymethylmethacrylate foil having a softening point according to Vicat of 110° C.

A lay-up of the following composition, viewed from the bottom towards the top, was compressed in a hydraulic hot press:

A polymethylmethacrylate foil of a thickness of 0.2 mm.;
A cushion or padding of cotton asbestos of a thickness of 5.0 mm.;
A polymethylmethacrylate foil of 0.2 mm.;
A pressure plate of brass, chromium plated on both sides, and having a thickness of 4.0 mm.;
A wood board of 10.0 mm. thickness; the wood board served as a buffer so as not to damage the decorative faces of the pressure plates;
A pressure plate of brass, chromium plated on both sides, and having a thickness of 4.0 mm.;
A polymethylmethacrylate foil of 0.2 mm.;
A cushion or padding of cotton-asbestos having a thickness of 5.0 mm.;
A polymethylmethacrylate foil having a thickness of 0.2 mm.

The compression temperature was 160° C. and the compression pressure was 20 kp./cm.$^2$.

The press was opened after a compression period of 5 minutes and the wood board was removed. The pressure plates are now secured to the pressure cushions while the pressure cushions, in turn, are secured to the heater plates. No sagging of the upper pressure plate could be observed. The press is now ready for operation. If the press is cooled to a temperature of about 20–30° C. then the pressure plates as well as the pressure cushions and the foils separate from each other and from the heater plates. If necessary, the plates and/or cushions may be slightly pulled which does not require any substantial force. Thus removal and exchange of pressure plates and pressure cushions is thus a simple matter.

Example 3.—Use of a polyethylene foil having a softening point according to Vicat of 40° C.

This experiment was carried out in a hydraulic hot press at a compression temperature of 120° C. and a press pressure of 12 kp./cm.$^2$. A lay-up assembly of the following composition, viewed from the bottom towards the top was compressed:

4 foils of polyethylene, each having a weight of 40 g./m.$^2$;
A pressure plate of aluminum of a thickness of 2 mm.;
A wood board of a thickness of 10 mm.;
A pressure plate of aluminum of a thickness of 2 mm.;
4 foils of polyethylene, each having a weight of 40 g./m.$^2$.

The press was opened after a compression period of 3 minutes and the wood board was removed. The pressure plates are now attached to the upper and lower heater plates of the press. No sagging of the upper pressure plate took place. The press is now ready for operation.

In contrast to Examples 1 and 2, the polyethylene foil can be separated from the heater plate with difficulty only, even when the heater plate is cold. However, the separation effect of the foil under cold conditions can be significantly improved by applying, prior to closing of the press, a small amount of zinc stearate to the outer surfaces of the outer foils.

Example 4.—Use of a silicone oil of a viscosity of 100,000 cp. at 20° C.

This experiment was carried out in a single opening hot press, 10 g. of silicone oil of a viscosity of 100,000 cp. at 20° C. was evenly applied to the lower heater plate of the press, the lower heater plate having a size of 25 x 25 cm. A chromium plated brass plate was inserted into the press with the chromium plated side facing upwardly. In order to protect the pressure plate during pressing operation, a hardboard sheet was placed on this pressure plate. 10 g. of silicone oil of a viscosity of 100,000 cp. at 20° C. were applied to the rear face of a second chromium plated brass pressure plate. This second pressure plate was inserted into the press with the chromium plated side facing the hardboard sheet. The press was now closed and heated to 160° C. After this temperature had been reached, a pressure of 20 kp./cm.$^2$ was maintained for 5 minutes. The press was opened thereafter and the hardboard sheet was removed. The upper and lower pressure plates are now fixed within the press and the press is ready for operation.

Example 5.—Use of a silicone oil having a viscosity of 50,000 cp. at 20° C. containing 50 parts by weight of aluminum dust.

This example is carried out in the same manner as described in Example 4. However, instead of using a silicone oil of 100,000 cp., a paste was employed which consists of 50 parts by weight of silicone oil of a viscosity of 50,000 cp. and 50 parts by weight of aluminum dust. The result obtained was essentially the same as that obtained in Example 4. The use of the paste results in satisfactory attachment of the pressure plates to the press.

The pressure plates attached in accordance with Examples 4 and 5 can be readily removed from the heater plates if the plates are slowly peeled off starting at a corner and pulling away from the heater plates.

The embodiments of the invention in which an exclusive property or privilege is claimed are defined as follows:

1. A method of temporarily attaching a pressure plate to the pressure transmitting surface of a heater plate of a hot press, which comprises introducing between the pressure plate and said surface of said heater plate a substance which is liquid under the operational conditions of the press, said substance, under the operational conditions of the press, forming an adhesive intermediate layer between said surface and said pressure plate, the adhesion forces and the cohesion force of said layer each corresponding at least to the weight of said pressure plate.

2. A method as claimed in claim 1, wherein said adhesion forces and said cohesion force are each sufficient to hold said pressure plate on said layer at least when said press is heated.

3. A method as claimed in claim 1, wherein said substance is a thermoplastic substance.

4. A method as claimed in claim 1, wherein said substance is in the form of a foil.

5. A method as claimed in claim 1, wherein said substance is in the form of a thermoplastic foil.

6. A method as claimed in claim 1, wherein a pressure cushion is interposed between said surface and said pressure plate, said substance being introduced between said surface and said pressure cushion and between said pressure cushion and said pressure plate, the adhesion forces and the cohesion force of the layers formed by said substance each corresponding at least to the weight of said pressure plate and said pressure cushion.

7. A method as claimed in claim 1, wherein said substance is also liquid at room temperature.

8. A method as claimed in claim 7, wherein said substance is silicone oil.

9. A method as claimed in claim 8, wherein said silicone oil has a viscosity of at least 10,000 cp. at 20° C.

10. A method as claimed in claim 1, wherein said substance is admixed with a heat conducting material in fine particle form.

11. A method as claimed in claim 10, wherein said material is a metal powder.

12. A method as claimed in claim 11, wherein said metal powder is aluminum powder.

13. A method as claimed in claim 1, wherein said substance is admixed with a separating agent to facilitate the removal of said pressure plate from said surface when said press is cold.

14. In a hot press having a pressure transmitting heater element, a pressure plate and means for temporarily attaching said pressure plate to said heater element, the improvement which comprises that said means is a layer of a substance located between said heater element and said pressure plate, said substance, under the operational conditions of the hot press, being liquid and exerting adhesion forces and a cohesion force which each correspond at least to the weight of said pressure plate.

15. The improvement as claimed in claim 14, wherein said adhesion forces and said cohesion force are sufficient to retain said pressure plate on said layer at least when the press is hot.

16. The improvement as claimed in claim 14 wherein said substance is a thermoplastic substance.

17. The improvement as claimed in claim 14, wherein said substance is in the form of a thermoplastic foil.

18. The improvement as claimed in claim 14, wherein a material of fine particle size and having heat conducting characteristics is distributed throughout said layer.

19. The improvement as claimed in claim 8, wherein said substance is a metal powder.

20. In a hot press having a heater plate, a pressure cushion, a pressure plate and means for temporarily attaching said pressure cushion to said heater plate and said pressure plate to said pressure cushion, the improvement which comprises that said means is a first layer extending between said heater plate and said pressure cushion and a second layer extending between said pressure cushion and said pressure plate, said first and second layers being formed from a substance which under the operational conditions of the press is liquid or and exerts adhesion forces and a cohesion force which each correspond at least to the weight of said pressure cushion and said pressure plate.

References Cited

UNITED STATES PATENTS

| | | | |
|---|---|---|---|
| 1,938,917 | 12/1933 | Loetscher | 156—276 X |
| 3,384,137 | 5/1968 | Ash | 100—93 P |
| 3,373,068 | 3/1968 | Grosheim et al. | 156—289 X |
| 3,003,413 | 10/1961 | Taylor et al. | 156—344 |
| 2,771,969 | 11/1956 | Brownlow | 156—276 X |
| 2,796,913 | 6/1957 | Fener et al. | 156—289 X |
| 3,112,243 | 11/1963 | Egerstrand | 100—93 P X |
| 2,861,372 | 11/1958 | Hunt | 156—344 X |
| 3,399,291 | 8/1968 | Limbach | 156—583 X |
| 3,236,174 | 2/1966 | Hutchinson et al. | 100—93 P |

CARL D. QUARFORTH, Primary Examiner

E. E. LEHMANN, Assistant Examiner

U.S. Cl. X.R.

100—132, 296; 156—309, 323